(12) United States Patent
Naski et al.

(10) Patent No.: US 6,645,387 B2
(45) Date of Patent: Nov. 11, 2003

(54) SEPARATOR DEVICE

(75) Inventors: Tommi Naski, Helsinki (FI); Sisko Viitala, Rajamäki (FI)

(73) Assignee: Evac International Oy, Helsinki (FI)

( * ) Notice: Subject to any disclaimer, the term of this patent is extended or adjusted under 35 U.S.C. 154(b) by 103 days.

(21) Appl. No.: 10/068,110

(22) Filed: Feb. 5, 2002

(65) Prior Publication Data

US 2002/0108902 A1 Aug. 15, 2002

(30) Foreign Application Priority Data

Feb. 15, 2001 (FI) .............................................. 20010285
Feb. 15, 2001 (FI) .............................................. 20010286

(51) Int. Cl.[7] .......................... C02F 1/40; B01D 17/045; B01D 21/02
(52) U.S. Cl. .................. 210/744; 210/800; 210/104; 210/187; 210/262; 210/521; 210/534; 210/537; 210/539; 210/540
(58) Field of Search ............................... 210/801, 803, 210/800, 521, 522, 532.1, 534, 535, 536, 537, 538, 539, 540, 187, 261, 262, 744, 104

(56) References Cited

U.S. PATENT DOCUMENTS

| | | | | |
|---|---|---|---|---|
| 745,519 A | * | 12/1903 | Pravicha et al. ............. | 210/521 |
| 1,199,099 A | * | 9/1916 | Münzer ....................... | 210/521 |
| 1,864,511 A | * | 6/1932 | Jones .......................... | 210/537 |
| 2,025,883 A | * | 12/1935 | Mobley ....................... | 210/801 |
| 3,862,040 A | * | 1/1975 | Preus et al. .................. | 210/540 |
| 3,933,654 A | * | 1/1976 | Middelbeek ................. | 210/521 |
| 4,122,016 A | * | 10/1978 | Tao et al. ..................... | 210/521 |
| 4,132,645 A | * | 1/1979 | Bottomley et al. .......... | 210/540 |
| 4,144,170 A | | 3/1979 | Dunkers ..................... | 210/211 P |
| 4,396,508 A | * | 8/1983 | Broughton ................... | 210/537 |
| 4,857,183 A | | 8/1989 | Bommer ...................... | 210/127 |
| 5,326,474 A | * | 7/1994 | Adams et al. ............... | 210/540 |
| 5,605,636 A | * | 2/1997 | Wyness ....................... | 210/801 |
| 5,725,760 A | * | 3/1998 | Monteith ..................... | 210/538 |

FOREIGN PATENT DOCUMENTS

| | | | | |
|---|---|---|---|---|
| EP | 0 277 300 A1 | 11/1987 | ............ | C02F/1/40 |
| EP | 0 602 329 A3 | 9/1993 | ............ | C02F/1/40 |
| EP | 974386 | * 1/2000 | | |
| FI | 67488 | 4/1985 | ............ | C02F/1/40 |
| WO | WO 98/49101 | 11/1998 | ............ | C02F/1/40 |

* cited by examiner

Primary Examiner—Christopher Upton
(74) Attorney, Agent, or Firm—Marshall, Gerstein & Borun LLP

(57) ABSTRACT

A method and device for separating grease from waste water. The separator device includes a receptacle with an upper first part and a lower second part separated by a plate. The receptacle further has an inlet port for waste water, a discharge port for separated waste water, discharge means for grease and/or sludge, and an overflow pipe establishing a connection between the receptacle first part and the receptacle second part. Waste water is supplied through the inlet port to the upper first part, and the waste water is allowed to undergo a separation by gravity, whereby a grease layer is formed on a separated waste water layer and a sludge layer on the plate. In order to achieve a high degree of separation, separated waste water is allowed to flow through the overflow pipe to the receptacle lower second part. Grease is removed from the grease layer and/or sludge from the sludge layer through the discharge means, and separated waste water is discharged through the discharge port.

37 Claims, 8 Drawing Sheets

SEPARATOR DEVICE

FIELD OF THE INVENTION

The present invention generally relates to methods and apparatus for separating grease from waste water.

BACKGROUND OF THE INVENTION

A conventional separator device is disclosed in EP 0 974 386. The known separator device comprises a container with an upper chamber and a lower chamber separated by an inclined intermediate plate. Waste water is supplied to the upper chamber of the container so that grease floating on the surface of the waste water is arranged to be drawn together with waste water through a connecting pipe, with an inlet opening at the top of the upper chamber, down to the lower chamber. Due to the force of gravity, the grease remains on top of the cleaned water in the lower chamber and is discharged through an opening near the highest point below the intermediate plate. The cleaned water is emptied from the upper chamber through a vertical pipe with an inlet near the bottom of the lower chamber and an outlet near the top of the upper chamber. Further sludge and solids may be emptied from the upper chamber near the lowest point above the inclined plate.

The grease separation of this known device is subject to a complicated flow pattern rendering the separation unreliable and requiring a number of procedural steps. Cleaning the device, i.e. maintaining a proper function of the device, is difficult because the grease comes in contact with most parts of the device. Furthermore, although the known separator relies on a basic separation process, it lacks any means for collecting grease in an efficient manner.

As referred to herein, waste water is generally considered to comprise used or dirty process water or so-called grey water. Such grey water may come, for example, from kitchens comprising water used for cleaning, maintenance or other purposes, or from bathrooms or wash basins. This water often contains grease, which, certainly in larger amounts, causes difficulties and problems when it enters a sewage system. Grease-laden or greasy waste water mixing with sewage in mains or piping causes the grease to congeal and adhere to sludge or solids, which may cause blocking of the piping. If such a mixture reaches a (biological) sewage treatment plant, it will decrease bacterial action and compromise the operation of the sewage treatment plant. Accumulated grease is also harmful in holding tanks for waste water as it forms deposits and disagreeable odors.

Consequently, it is of great importance to prevent grease from entering sewage systems. This requires an appropriately functioning grease separator, preferably in the drain line at or near the source of the grease.

A high degree of grease separation is also advantageous in view of the subsequent handling of the grease. If the grease is stored, it lessens the storage volume, and, if the grease is incinerated, incineration of other substances, such as sludge and water is avoided.

As used herein, untreated waste water (i.e. grease-laden or greasy waste water) will be called waste water or grey water. Waste water or grey water that has been subject to grease separation will be called separated waste water or separated grey water.

Accordingly, there is a need to provide a method and apparatus for separating grease, in which the above-mentioned drawbacks are avoided and in which an efficient and high degree of grease separation and reliable operation are attained.

SUMMARY OF THE INVENTION

In accordance with the teachings of the present invention, separation by gravity force is enhanced by utilizing the normal layer formation of the materials subject to separation in a grease separator. This is realized by forming a controlled and stable separated waste water layer between the lighter grease layer on the surface and the heavier sludge layer on the bottom of waste water collected in the grease separator. This provides for effective handling of the three main layers.

In addition, means is provided for effectively removing the grease from the grease layer, regardless of the circumstances in which the grease separator is used. Accordingly, means is provided for discharging grease positioned in the grease layer, the means having a relatively large grease receiving portion and a discharge end portion that can be modified for varying discharge methods.

The separation process is advantageously controlled or monitored by a control means, e.g. an observation window provided in the separator device.

The filling degree and discharge of separated waste water is advantageously controlled by level control means.

By arranging the grease discharging means as a discharge port, grease can advantageously be removed from the grease layer by way of gravity or by a pump means.

Another advantageous way of removing grease from the grease layer is by a suction means extending into the grease layer.

Grease may be removed from the grease layer by a pipe means having a receiving portion with a substantially larger cross-section than said pipe means and opening upwards towards the surface area of the grease layer by way of gravity, by suction, or by a pump means in order to increase the efficiency of the grease removal.

By arranging the receiving portion to settle in the grease layer and to follow the movements of the grease layer and the separated waste water layer, grease removal becomes efficient even in unstable circumstances, such as in a moving or rolling vehicle.

In order to provide for efficient grease flow, at least the upper part of the receptacle is advantageously arranged to be heated by heating means.

For maintenance and efficient operational purposes, at least the upper part of the receptacle is advantageously arranged to be cleaned by cleaning means.

Other features and advantages are inherent in the embodiments claimed and disclosed, or will become apparent to those skilled in the art from the following detailed description and accompanying drawings.

DETAILED DESCRIPTION

Figure 1:
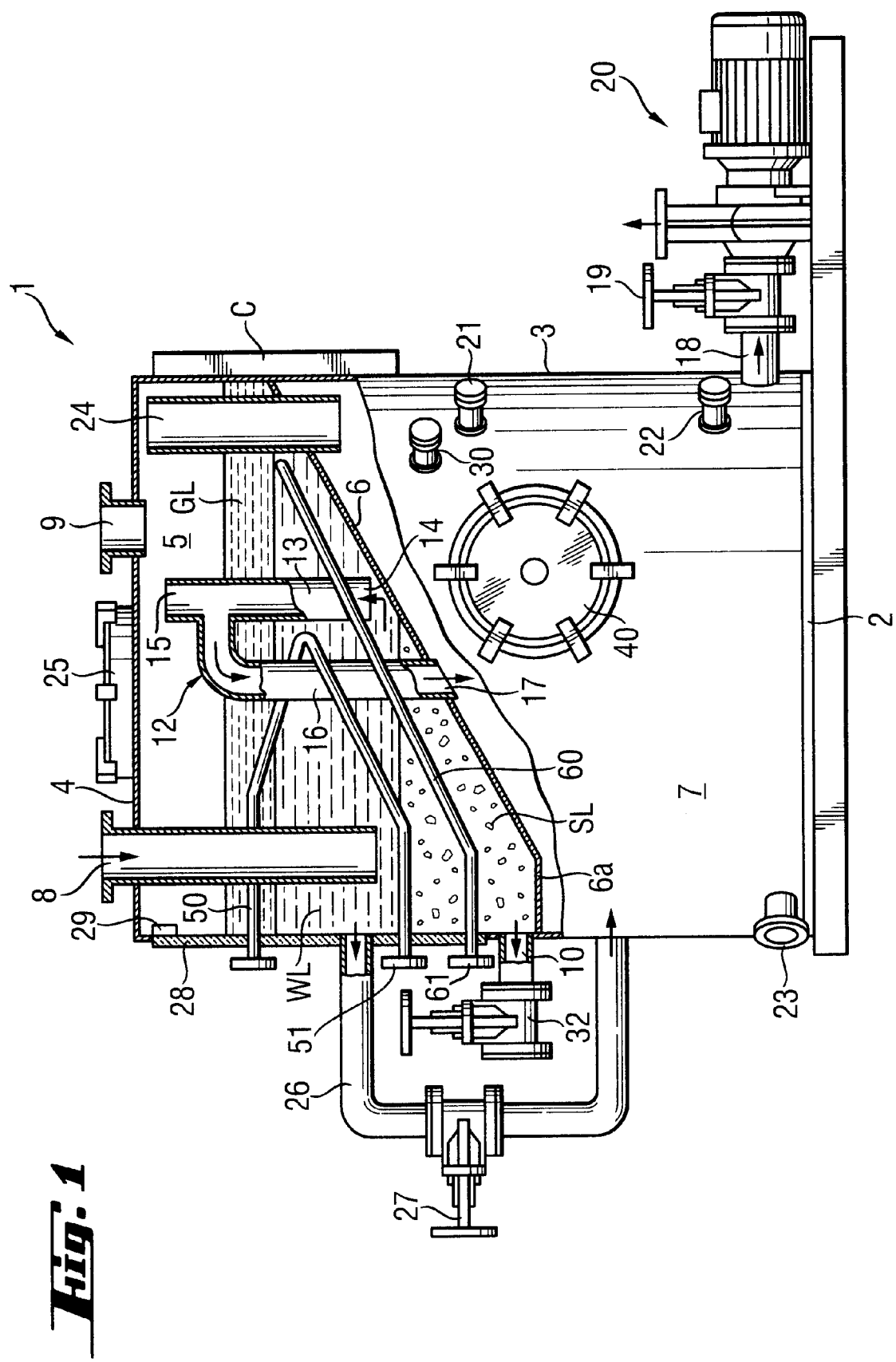
FIG. 1 shows a side view in section of a first embodiment of a separator device.
Figure 2:
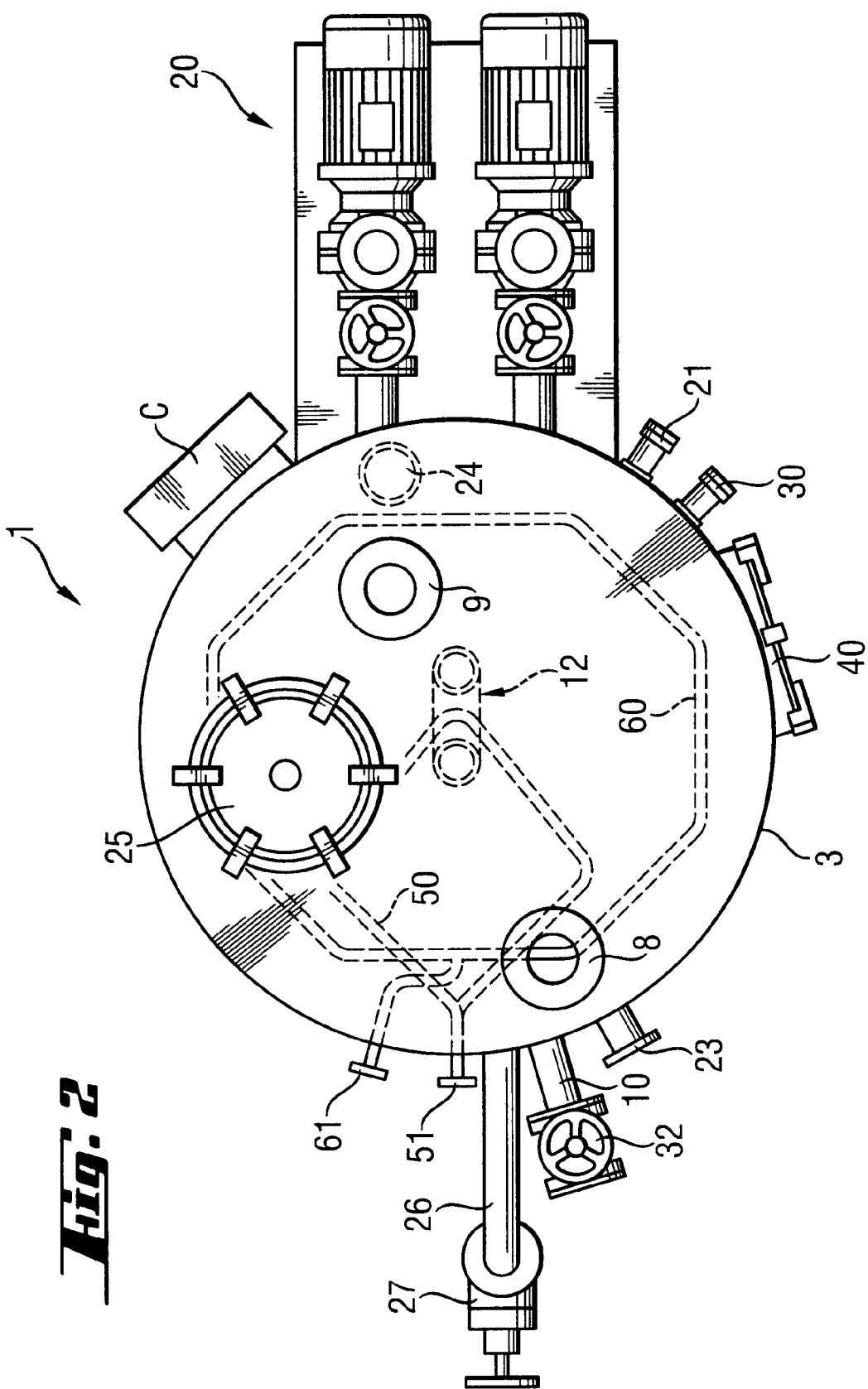
FIG. 2 shows a top view of the separator device according to FIG. 1.

The separator device according to FIGS. 1 and 2 comprises a receptacle 1 having a generally cylindrical configuration and comprising a base portion 2, a side wall portion 3 and a cover portion 4. The receptacle is divided into an upper first part 5 and a lower second part 7 by an intermediate plate 6, 6a. The intermediate plate, in the sectioned embodiment shown, is inclined substantially throughout the receptacle 1 with a short substantially plane portion 6a at the lowermost end of the intermediate plate, adjacent the side wall portion 3. The receptacle and the intermediate plate may have different configurations, e.g. the receptacle may be rectangular and the intermediate plate sloped with a more curved configuration. The side wall portion 3 of the receptacle 1, along the upper first part 5, is provided with a control means 28, in this embodiment an observation window, which preferably is provided with a window flush means 29. The control means are intended for controlling or monitoring the grease layer GL, the separated water layer WL and the sludge layer SL. The observation window 28 described above may be replaced or supplemented by other control means, e.g. level control means or timing control means.

The cover portion 4 of the upper first part 5 of the receptacle 1 is provided with an inlet port 8 for waste water. The upper first part 5 of the receptacle is also provided with a first ventilation means 9 arranged in the cover portion 4 of the receptacle 1. At the lowermost end of the intermediate plate 6, in the area of the short substantially plane portion 6a, the side wall portion 3 is provided with discharge means 10 for grease and for sludge. In this embodiment the discharge means is shown as a discharge port 10 provided with a closure means 32, e.g. a valve means. The cover portion 4 is also provided with a first manhole 25.

The upper first part 5 of the receptacle 1 is further provided with an overflow pipe 12 with a generally U-shaped configuration. A first leg 13 of the overflow pipe 12 comprises a substantially vertical part providing an inlet opening 14 at one end, which opens towards the intermediate plate 6, adjacent the intermediate plate, and at an opposite end a ventilation opening 15. The second leg 16 of the overflow pipe 12 is turned towards the intermediate plate 6, substantially parallel with the first leg 13, and passes through the intermediate plate 6 providing an outlet opening 17, which opens into the lower second part 7 of the receptacle 1.

The placing of the overflow pipe 12 should be as low as possible, i.e. towards the lowermost end of the intermediate plate 6 in order to have a low separated waste water layer WL in the upper first part 5 of the receptacle 1. However, any overflow of sludge should be prevented. Also the inlet port 8 should be as far away as possible from the inlet opening 14 of the overflow pipe 12, so that the grease has time to flow up to the surface, before coming into contact with the inlet opening 14.

The lower second part 7 of the receptacle 1, in the side wall portion 3, is provided with a discharge port 18 for separated waste water. In this embodiment the discharge port 18 is provided with a pump means 20, comprising a valve means 19.

For monitoring the filling degree and discharge of separated waste water from the lower second part 7 of the receptacle 1, the lower second part 7 is provided with an upper level control means 21 and a lower level control means 22, which is arranged somewhat above the discharge port 18. The lower second part 7 is advantageously also provided with a supplementary discharge port 23 at the lower area of the second part 7, adjacent the base portion 2 of the receptacle 1. An additional high level control means 30 arranged above the upper level control means 21 is advisable as a check means. Furthermore, the lower second part 7 is provided with a ventilation means 24, which passes through the intermediate plate 6 and reaches up to a level just below the cover portion 4 of the receptacle 1 in order to prevent inflow of grease or waste water into the ventilation means.

In order to provide a further separated waste water connection between the upper first part 5 and the lower second part 7 of the receptacle 1, the side wall portion 3 of the receptacle 1 is provided with a connecting pipe 26 leading from the upper first part 5 to the lower second part 7. The connecting pipe 26 is provided with a valve means 27.

The lower second part of the receptacle is also provided with a second manhole 40 in the side wall portion, e.g. for inspection and maintenance access.

The separator device according to the above described embodiment has the following operation principle.

Waste water is supplied to the upper first part 5 of the receptacle 1 through the inlet port 8. Usually the flow of waste water is so rapid that the amount of grease entering the inlet opening 14 of the overflow pipe 12 is negligible. As the waste water level rises, the waste water undergoes a separation by gravity, whereby a grease layer GL forms on a separated waste water layer WL, and sludge contained in the waste water settles as a sludge layer SL on the intermediate plate 6, 6a. The sludge collects towards the lowermost end, the substantially plane portion 6a of the intermediate plate 6, due to the inclination of the intermediate plate. The grease following with the waste water collects and accumulates in the grease layer GL.

At the same time, as waste water is supplied and the grease rises to the surface, separated waste water starts to flow through the U-shaped overflow pipe 12 from the upper first part 5 to the lower second part 7 of the receptacle 1. The separated waste water enters the inlet opening 14 of the overflow pipe 12, flows over to the second leg 16 and enters the lower second part 7 of the receptacle 1 through the outlet opening 17. This allows the grease layer GL to accumulate and keeps the upper level of the grease layer GL approximately at the level of the bend of the overflow pipe 12. It has been shown that about 5 to 10 per cent of the grease layer may float above said bend.

Alternatively the upper first part 5 of the receptacle 1 may firstly be provided with an operational (clean) water level that is kept above the inlet opening 14 of the internal overflow pipe 12. This is to ensure that, when waste water is supplied to the receptacle 1 through the inlet port 8, the grease is separated by gravity, whereby it floats up to the waste water surface, forming a grease layer GL, and does not enter the inlet opening 14 of the internal overflow pipe 12. As the supply of waste water is continued and the waste water level rises to the bend of the internal overflow pipe 12, the separated waste water flows over from the upper first part 5 of the receptacle 1 via the internal overflow pipe 12 and passes through the intermediate plate 6 and through the outlet opening 17 into the lower second part 7 of the receptacle 1.

The amount of separated waste water that flows into the lower second part 7 of the receptacle 1 is controlled or monitored by the upper level control means 21 and the lower level control means 22. When the separated waste water level reaches the upper level control means 21, the separated waste water may be discharged by the pump 20. When the waste water level falls down to the lower level control means 22, discharge is discontinued by stopping the pump 20. The valve 19 is normally kept open. It may be closed e.g. for maintenance of the pump 20.

Further, the lower second part 7 may be provided with a high level control means 30, which may be arranged to issue an alarm, if the upper and/or lower level control means or the valve or discharge means malfunction in a manner that results in an excessive rise of the separated waste water level in the lower second part 7 of the receptacle 1. In a situation like this, for example, the supplementary discharge port 23 may be used to empty the lower second part 7, or the pump 20 may be started manually.

The pump 20 is generally arranged to empty the separated waste water into a sewage treatment plant or holding tank. The supplementary discharge port 23 may also be used as a by-pass, if the latter are not available, e.g. due to maintenance or malfunction, or if the separated water is discharged directly overboard. FIG. 2 also shows how a complementary pump means may be provided.

As waste water is supplied through the inlet port 8, sludge gathers on the intermediate plate 6, 6a. The accumulation of the sludge layer SL may be monitored through the observation window 28. When the sludge layer SL reaches up to a given first level, i.e. the lower side of the upper branch of the connection pipe 26, the valve 27 is opened so that separated waste water may flow down to the second lower part 7 of the receptacle from the upper first part 5. This causes the grease layer GL to sink, which also may be monitored through the observation window 28, and when it reaches a given second level, i.e. the upper side of the upper branch of the connection pipe 26, the valve 27 is closed. The sinking of the grease layer GL corresponds directly to a lowering of the separated water layer WL. At this point grease and sludge may be emptied from the upper first part 5 of the receptacle 1, in this embodiment through the discharge port 10 by gravity.

The amount of separated waste water remaining between the sludge layer SL and the grease layer GL corresponds to the diameter of the connection pipe 26, which in practice amount only to some mm, rendering the amount of separated waste water negligible in view of the achieved degree of grease separation.

In order to ensure that (mainly) the grease is maintained in an easily flowable condition, the upper first part 5 of the receptacle 1 may be provided with a heating means 50 and a thereto related temperature control means (not shown). The heating means may advantageously be in the form of a steam coil 50, preferably at least to some extent passing through the area of the grease layer GL in the upper first part 5 of the receptacle 1. The temperature control means may be in the form of a thermometer readable from the outside of the receptacle 1. The steam inlet end 51 of the steam coil 50 may be provided with a control valve, which is monitored by a temperature control means placed in the upper first part 5 of the receptacle 1. The steam coil 50 may be placed in a different way then shown in the figures, since heat transfers satisfactorily in fluid circumstances.

Any other suitable heating and temperature control means may naturally be used, e.g. the intermediate plate 6, 6a may be provided with a heating means, for example an embedded electrical coil.

For cleaning and maintenance purposes the receptacle 1 is advantageously provided with a cleaning means at least in the upper first part 5 of the receptacle 1. The cleaning means may advantageously be in the form of a water flushing means 60 with an inlet port 61 connected to any clean water source available at the location of the separator device. Such a flushing means may also be used for providing and maintaining the operational (clean) water level as discussed above. The water flushing means 60, for example in the form of a perforated pipe, is advantageously drawn near the intermediate plate 6, 6a and the side wall portion 3 of the receptacle to ensure that parts easily collecting dirt are thoroughly flushed.

Depending on the circumstances and requirements, also the lower second part 7 of the receptacle 1 may be heated and cleaned by corresponding means. The separator device according to FIG. 3 corresponds with regard to design and operation principle to the embodiment according to FIGS. 1 and 2, whereby corresponding reference numerals/signs have been used for corresponding parts. The main difference in this embodiment is that the discharge means for grease and for sludge comprise a discharge port 10 and a pump means 31 and that the discharge port 18 for separated waste water only is provided with a valve means 19, whereby separated waste water is discharged by gravity.

Figure 4:
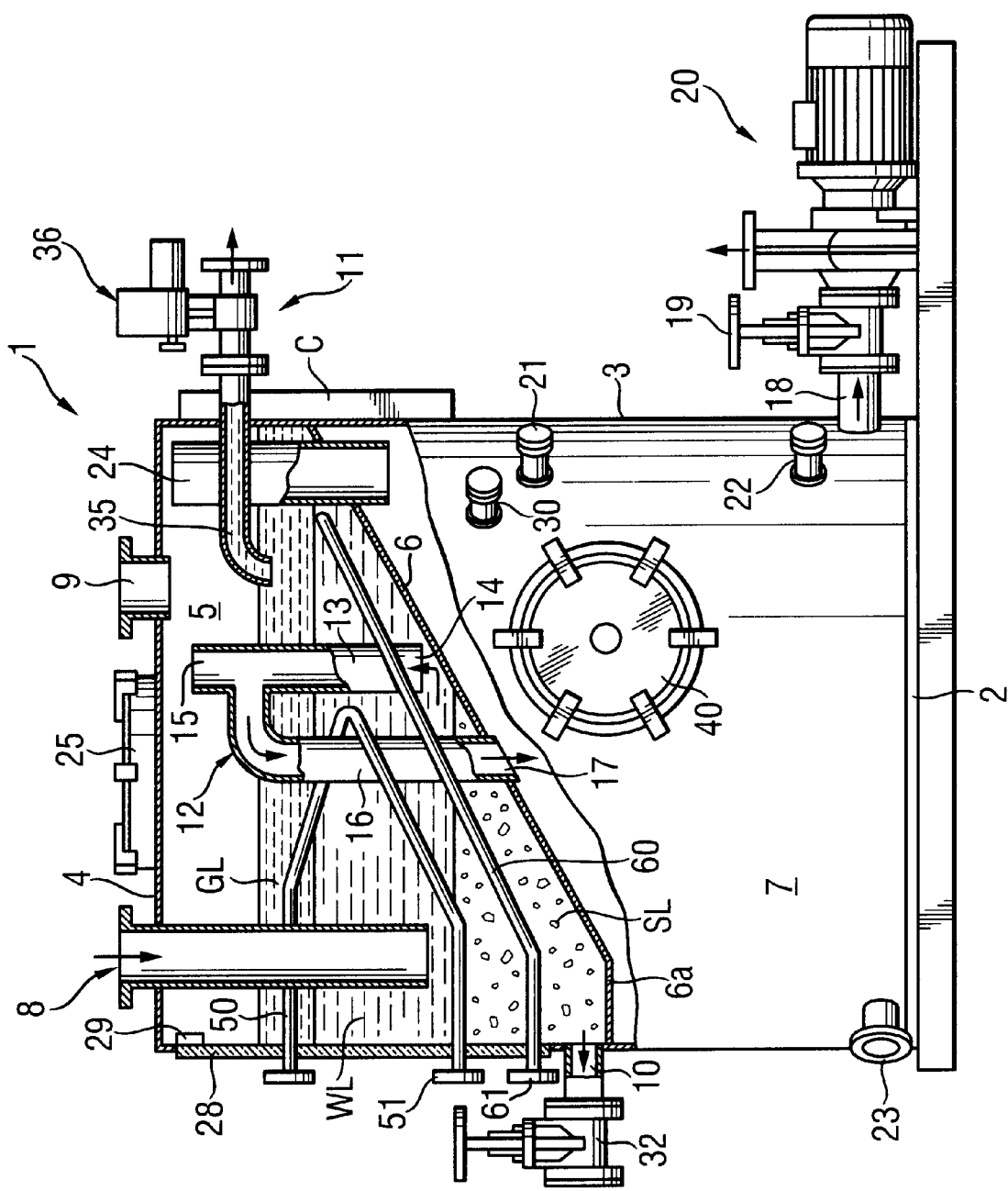
FIG. 4 shows a side view in section of a third embodiment of a separator device.

The separator device according to FIG. 4 substantially corresponds with regard to design and operation principle to the embodiments according to FIGS. 1 and 2, whereby corresponding reference numerals/signs have been used for corresponding parts. In this embodiment, however, grease is arranged to be removed from the grease layer GL by a discharge means in the form of a suction means 11 arranged in the side wall portion 3 of the upper first part of the receptacle 1. The suction means 11 comprise a suction pipe 35 having one end extending into the grease layer GL and an other end connected to a vacuum source (not shown). The suction action is activated by opening a motor activated valve means 36. Alternatively the suction means 11 could comprise a pump means (not shown). The suction of grease may be monitored from the observation window 28. Advantageously, the end of the suction pipe extending into the grease layer GL is maneuverable in a horizontal and/or vertical direction. This can be arranged e.g. by providing the suction pipe with a telescopic arrangement.

This embodiment could further be provided with a connecting pipe 26 and a valve means 27 (not shown) as described in connection with the embodiments according to FIGS. 1 and 2 for discharging separated waste water to the lower second part 7 of the receptacle after the grease has been removed. Sludge is removed through the discharge port 10.

Figure 3:
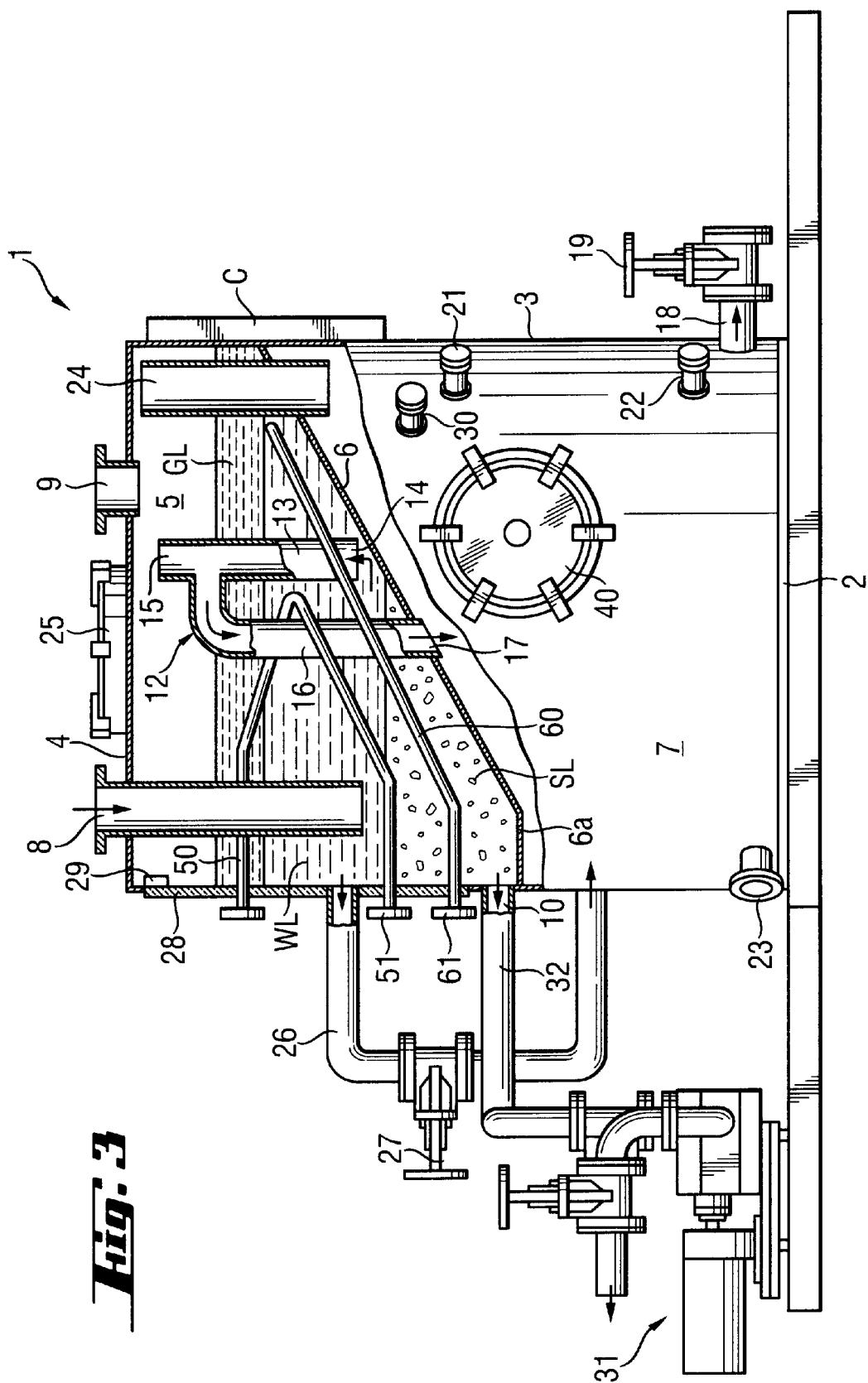
FIG. 3 shows a side view in section of a second embodiment of a separator device.

It is understood that the embodiments according to FIGS. 3 and 4 may also be provided with heating means and cleaning means as described in connection with FIGS. 1 and 2, although not shown in FIGS. 3 and 4.

The first manhole 25 provided in the cover portion 4 of the receptacle 1 could also be used as an alternative discharge means for grease in the embodiments described above.

The separator device and its operational components are advantageously connected to a electronic control center C so that the functions of the discharge means, level control means, heating means, temperature control means, flushing means, etc. may be monitored and managed in an optimal manner.

Figure 5:
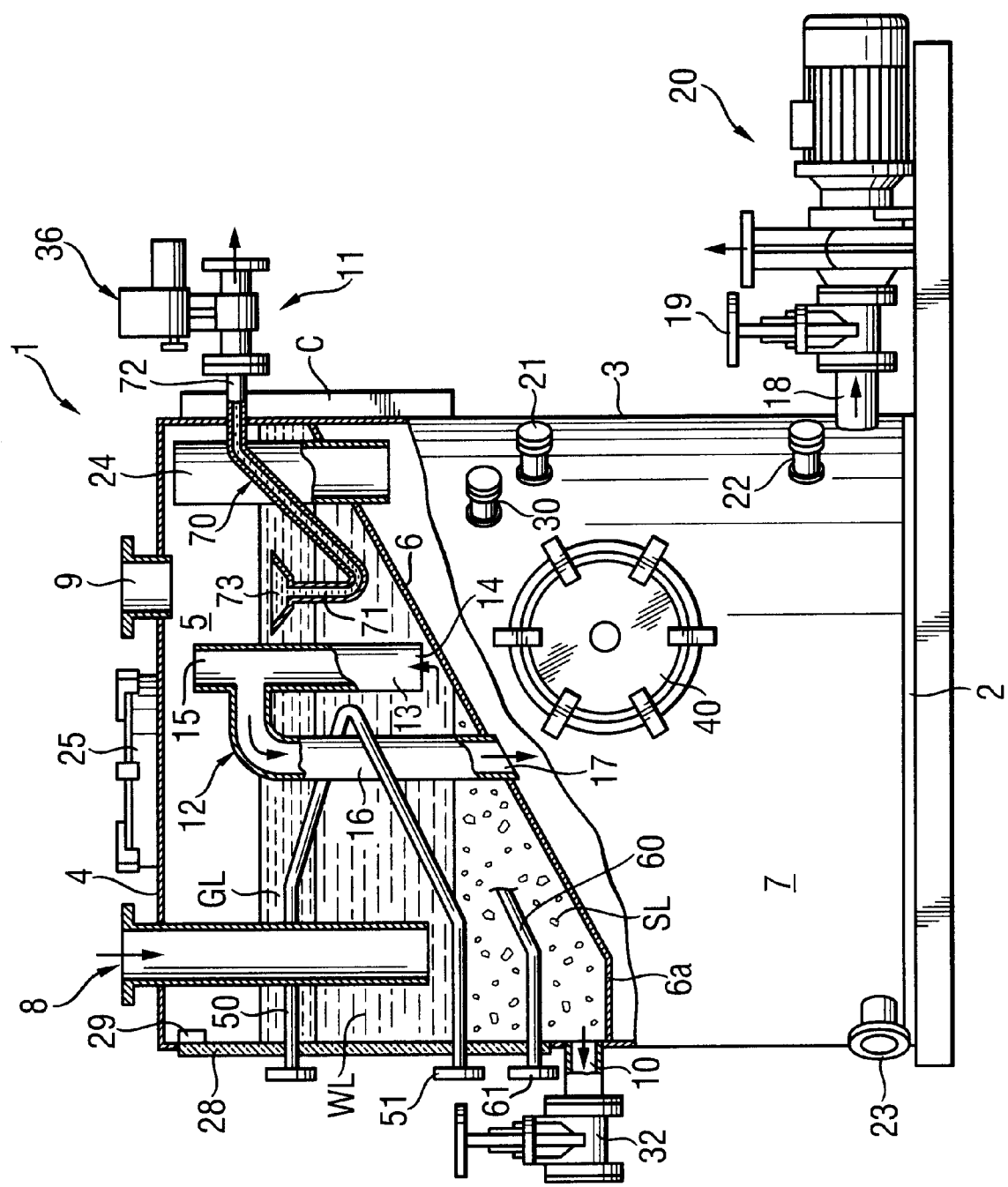
FIG. 5 shows a side view in section of a fourth embodiment of a separator device.
Figure 6:
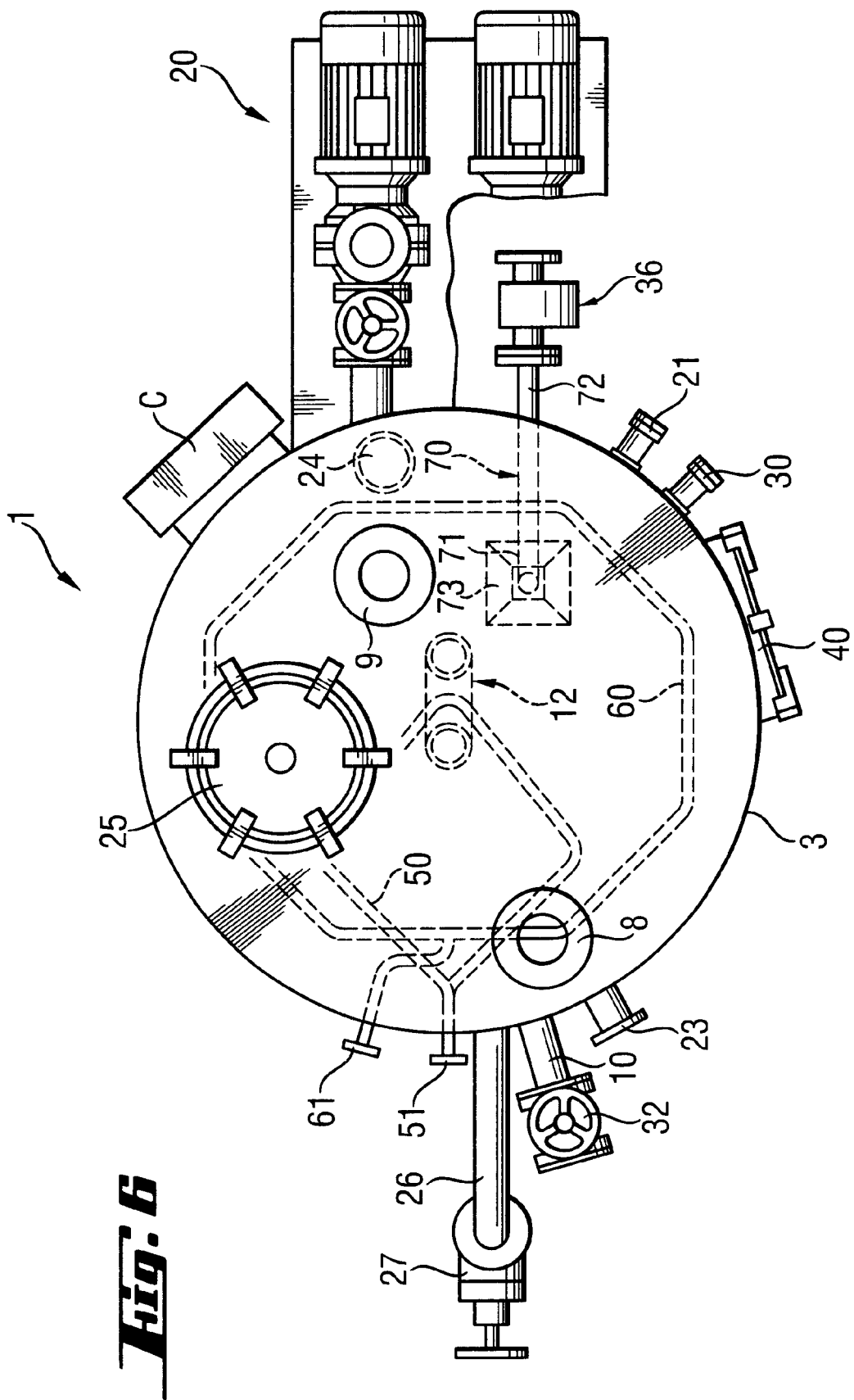
FIG. 6 shows a top view of the separator device according to FIG. 5.

The separator device according to FIGS. 5 and 6 substantially corresponds with regard to design and operation principle to the embodiments according to FIGS. 1 to 4, whereby corresponding reference numerals/signs have been used for corresponding parts The separator device comprises a receptacle 1 having a generally cylindrical configuration and comprising a base portion 2, a side wall portion 3 and a cover portion 4. The receptacle is divided into an upper first part 5 and a lower second part 7 by an intermediate plate 6, 6a. The intermediate plate, in the sectioned embodiment shown, is inclined substantially throughout the receptacle 1 with a short substantially plane portion 6a at the lowermost end of the intermediate plate, adjacent the side wall portion 3. The receptacle and the intermediate plate may have different configurations, e.g. the receptacle may be rectangular and the intermediate plate sloped with a more curved configuration. The side wall portion 3 of the receptacle 1, along the upper first part 5, is provided with a control means 28, in this embodiment an observation window, which preferably is provided with a window flush means 29. The control means are intended for controlling or monitoring the grease layer GL, the separated water layer WL and the sludge layer SL. The observation window 28 described above may be replaced or supplemented by other control means, e.g. level control means or timing control means.

The cover portion 4 of the upper first part 5 of the receptacle 1 is provided with an inlet port 8 for waste water. The upper first part 5 of the receptacle is also provided with a ventilation means 9 arranged in the cover portion 4 of the receptacle 1. At the lowermost end of the intermediate plate 6, in the area of the short substantially plane portion 6a, the side wall portion 3 is provided with discharge means 10 for sludge. The discharge means is shown as a discharge port 10 provided with a closure means 32, e.g. a valve means. The cover portion 4 is also provided with a first manhole 25.

The upper first part 5 of the receptacle 1 is further provided with an overflow pipe 12 with a generally U-shaped configuration. A first leg 13 of the overflow pipe 12 comprises a substantially vertical part providing an inlet opening 14 at one end, which opens towards the intermediate plate 6, adjacent the intermediate plate, and at an opposite end a ventilation opening 15. The second leg 16 of the overflow pipe 12 is turned towards the intermediate plate 6, substantially parallel with the first leg 13, and passes through the intermediate plate 6 providing an outlet opening 17, which opens into the lower second part 7 of the receptacle 1.

The placing of the overflow pipe 12 should be as low as possible, i.e. towards the lowermost end of the intermediate plate 6 in order to have a low separated waste water layer WL in the upper first part 5 of the receptacle 1. However, any overflow of sludge should be prevented. Also the inlet port 8 should be as far away as possible from the inlet opening 14 of the overflow pipe 12, so that grease has time to float up to the surface, before coming into contact with the inlet opening 14.

The lower second part 7 of the receptacle 1, in the side wall portion 3, is provided with a discharge port 18 for separated waste water. In this embodiment the discharge port 18 is provided with a pump means 20, comprising a valve means 19.

For monitoring the filling degree and discharge of separated waste water from the lower second part 7 of the receptacle 1, the lower second part 7 is provided with an upper level control means 21 and a lower level control means 22, which is arranged somewhat above the discharge port 18. The lower second part 7 is advantageously also provided with a supplementary discharge port 23 at the lower area of the second part 7, adjacent the base portion 2 of the receptacle 1. An additional high level control means 30 arranged above the upper level control means 21 is advisable as a check means. Furthermore, the lower second part 7 is provided with a ventilation means 24, which passes through the intermediate plate 6 and reaches up to a level just below the cover portion 4 of the receptacle 1 in order to prevent inflow of grease or waste water into the ventilation means.

The lower second part of the receptacle is also provided with a second manhole 40 in the side wall portion, e.g. for inspection and maintenance access.

The separator device according to the above described embodiment has the following operation principle.

Waste water is supplied to the upper first part 5 of the receptacle 1 through the inlet port 8. Usually the flow of waste water is so rapid that the amount of grease entering the inlet opening 14 of the overflow pipe 12 is negligible. As the waste water level rises, the waste water undergoes a separation by gravity, whereby a grease layer GL forms on a separated waste water layer WL and sludge contained in the waste water settles as a sludge layer SL on the intermediate plate 6, 6a. The sludge collects towards the lowermost end, the substantially plane portion 6a of the intermediate plate 6, due to the inclination of the intermediate plate. Sludge is discharged when necessary from the discharge port 10. The accumulation of the sludge layer SL and the discharge of sludge may be monitored through the observation window 28 or other applied control means.

At the same time, as waste water is supplied and the grease rises to the surface, separated waste water starts to flow through the U-shaped overflow pipe 12 from the upper first part 5 to the lower second part 7 of the receptacle 1. The separated waste water enters the inlet opening 14 of the overflow pipe 12, flows over to the second leg 16 and enters the lower second part 7 of the receptacle 1 through the outlet opening 17. This allows the grease layer GL to accumulate and keeps the upper level of the grease layer GL at the level of the bend of the overflow pipe 12. It has been shown that about 5 to 10 percent of the grease layer may float above said bend.

Alternatively the upper first part 5 of the receptacle 1 may firstly be provided with an operational (clean) water level that is kept above the inlet opening 14 of the internal overflow pipe 12. This is to ensure that, when waste water is supplied to the receptacle 1 through the inlet port 8, the grease is separated by gravity, whereby it floats up to the waste water surface, forming a grease layer GL, and does not enter the inlet opening 14 of the internal overflow pipe 12. As the supply of waste water is continued and the waste water level rises to the bend of the internal overflow pipe 12, the separated waste water flows over from the upper first part 5 of the receptacle 1 via the internal overflow pipe 12 and passes through the intermediate plate 6 and through the outlet opening 17 into the lower second part 7 of the receptacle 1. The grease following with the waste water collects and accumulates in the grease layer GL.

The amount of separated waste water that flows into the lower second part 7 of the receptacle 1 is controlled or monitored by the upper level control means 21 and the lower level control means 22. When the separated waste water level reaches the upper level control means 21, the separated waste water may be discharged by the pump 20. When the waste water level falls down to the lower level control means 22, discharge is discontinued by stopping the pump 20. The valve 19 is normally kept open. It may be closed e.g. for maintenance of the pump 20.

Further, the lower second part 7 may be provided with a high level control means 30, which may be arranged to issue an alarm, if the upper and/or lower level control means or the valve or discharge means malfunction in a manner that results in an excessive rise of the separated waste water level in the lower second part 7 of the receptacle 1. In a situation like this, for example, the supplementary discharge port 23 may be used to empty the lower second part 7, or the pump 20 may be started manually.

The pump 20 is generally arranged to empty the separated waste water into a sewage treatment plant or holding tank. The supplementary discharge port 23 may also be used as a by-pass, if the latter are not available, e.g. due to maintenance or malfunction, or if the separated water is discharged directly overboard.

When the grease layer GL has accumulated to a sufficient degree, which may be monitored by the control means 28, the discharge of grease may be initiated.

As an alternative to the embodiments described above, in the embodiment of FIGS. 5 and 6 the discharge of grease is arranged to be carried out by a discharge means for grease comprising a pipe means 70 with a first end 71 positioned in the upper first part 5 of the receptacle 1 and a second end 72 leading out of the receptacle 1 through the side wall portion 3. The first end 71 comprises a receiving portion 73 with a substantially larger cross-section than the first end of the pipe means. The receiving portion 73 opens upwards towards the surface of the grease layer GL as shown in the figures. The large cross-section makes it possible to collect grease from a much larger area at the same time, in comparison with what may be done with a normal pipe end with a relatively small cross-section, rendering the collection of grease more balanced and effective. The upper level of the receiving portion 73 is preferably positioned just slightly above the bend of the overflow pipe 12, at which level also the upper surface of the grease layer GL settles in view of the overflow procedure. Thus, in principle the grease layer may be sucked out in entirety.

In the embodiment shown the receiving portion 73 has a funnel-like form which enhances the flow of grease into the pipe means 70. FIG. 6 further shows the receiving portion 73 having a rectangular cross-section; other configurations are naturally possible as well. This particular discharge means will be discussed more in detail in connection with FIGS. 8 and 9 below.

The second end 72 of the pipe means 70 is in communication with a vacuum source (not shown), whereby the second end 72 is provided with a motor actuated valve means 36. In order to discharge the grease, a suction effect is generated to the receiving portion 73 by vacuum, whereby collection of grease may be carried out. The funnel-like form of the receiving portion 73 spreads the suction effect over the entire cross-section of the receiving portion 73. The motor actuated valve 36 may e.g. be operated manually based on observation through the observation window 28. Alternatively the operation of the motor actuated valve 36 may e.g. be time-controlled or responsive to a grease-responsive sensor means in the receiving portion 73.

Figure 7:
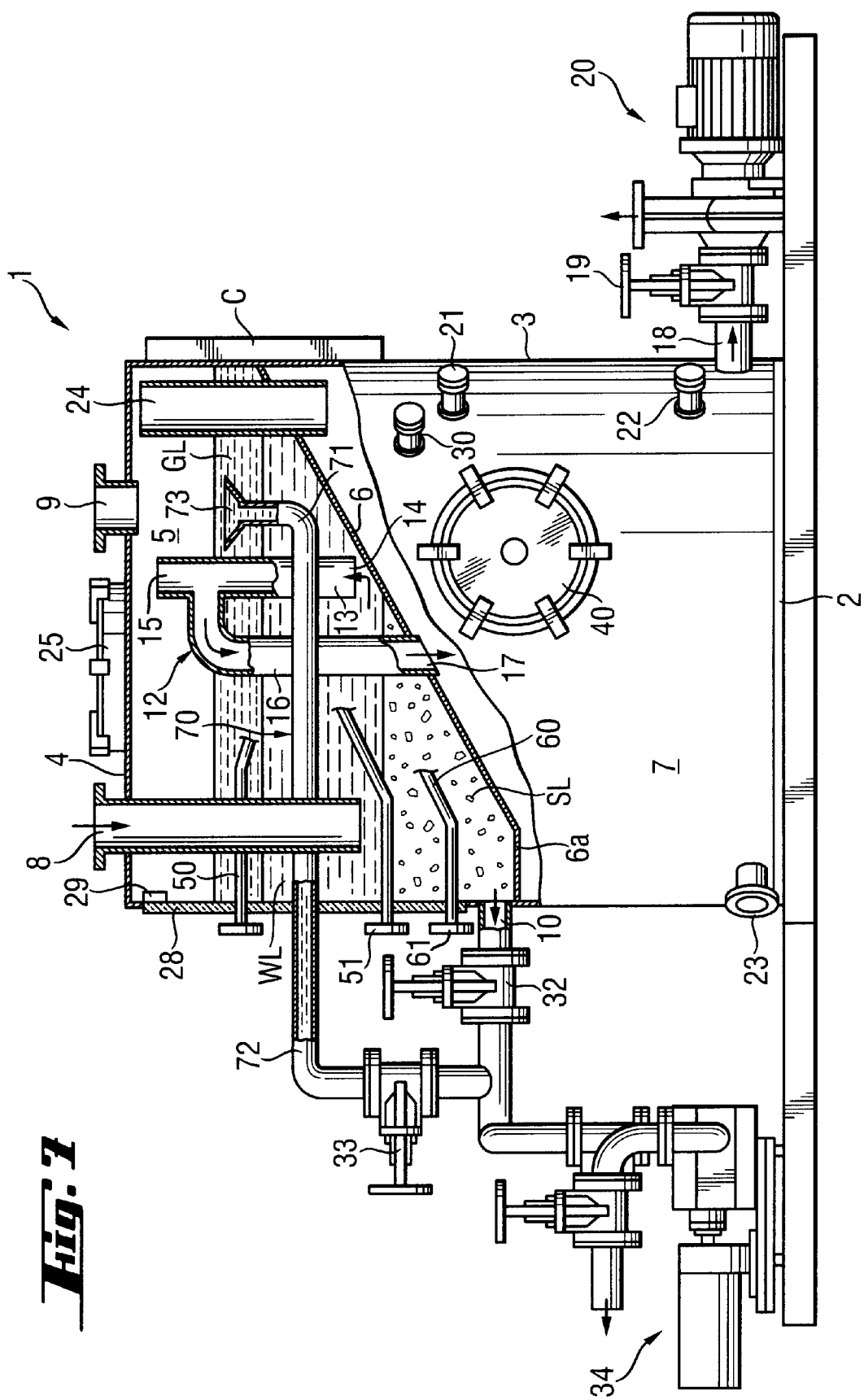
FIG. 7 shows a side view in section of a fifth embodiment of a separator device.

Instead of a vacuum source a pump means may be used as well. Also, by arranging the second end 72 of the pipe means sufficiently lower than the receiving portion 73, discharge of grease may be achieved by way of gravity (as indicated in FIG. 7).

In order to ensure that (mainly) the grease is maintained in an easily flowable condition, the upper first part 5 of the receptacle 1 may be provided with a heating means 50 and a thereto related temperature control means (not shown). The heating means may advantageously be in the form of a steam coil 50, preferably at least to some extent passing through the area of the grease layer GL in the upper first part 5 of the receptacle 1. The temperature control means may be in the form of a thermometer readable from the outside of the receptacle 1. The steam inlet end 51 of the steam coil 50 may be provided with a control valve, which is monitored by a temperature control means placed in the upper first part 5 of the receptacle 1. The steam coil 50 may be placed in a different way then shown in the figures, since heat is satisfactorily transferred in fluid circumstances.

Any other suitable heating and temperature control means may naturally be used, e.g. the intermediate plate 6, 6a may be provided with a heating means, for example an embedded electrical coil.

Another alternative is to provide a heating means in the receiving portion 73 and/or the pipe means 70 of the grease discharge means as discussed in connection with FIGS. 8 and 9.

For cleaning and maintenance purposes the receptacle 1 is advantageously provided with a cleaning means at least in the upper first part 5 of the receptacle 1. The cleaning means may advantageously be in the form of a water flushing means 60 with an inlet port 61 connected to any clean water source available at the location of the separator device. Such a flushing means may also be used for providing and maintaining the operational water level as discussed above. The water flushing means 60, for example in the form of a perforated pipe, is advantageously drawn near the intermediate plate 6, 6a and the side wall portion 3 of the receptacle to ensure that the parts easily collecting dirt are thoroughly flushed.

Depending on the circumstances and requirements, also the lower second part 7 of the receptacle 1 according to FIGS. 5 and 6 may be heated and cleaned by corresponding means.

The separator device according to FIG. 7 corresponds with regard to design and operation principle to the embodiment according to FIGS. 5 and 6, whereby corresponding reference numerals/signs have been used for corresponding parts. In this embodiment, however, the discharge means for grease comprise a valve means 33 and a pump means 34 at the second end 72 of the pipe means 70 outside the receptacle 1. The discharge port 10, including valve means 32, also communicates with the same pump means 34. For the discharge of grease, the valve means 33 is opened and the pump means 34 started, whereby the valve means 32 is kept closed. Correspondingly, for the discharge of sludge, the valve means 32 is opened and the pump means 34 started, whereby the valve means 33 is kept closed.

The pump means 34 may e.g. be operated manually based on observation through the observation window 28. Alternatively the operation of the pump means 34 may e.g. be time-controlled or responsive to a grease-responsive sensor means in the receiving portion 73.

The discharge means of FIGS. 5, 6 and 7, i.e. the pipe means including the receiving portion, may be arranged to be maneuverable in a horizontal and/or vertical direction. This can be arranged e.g. by providing the pipe means with a telescopic arrangement.

The separator device and its operational components are advantageously connected to a electronic control center C (FIGS. 5, 6 and 7) so that the functions of the discharge means, level control means, heating means, temperature control means, flushing means, etc. may be monitored and managed in an optimal manner.

Figure 8:
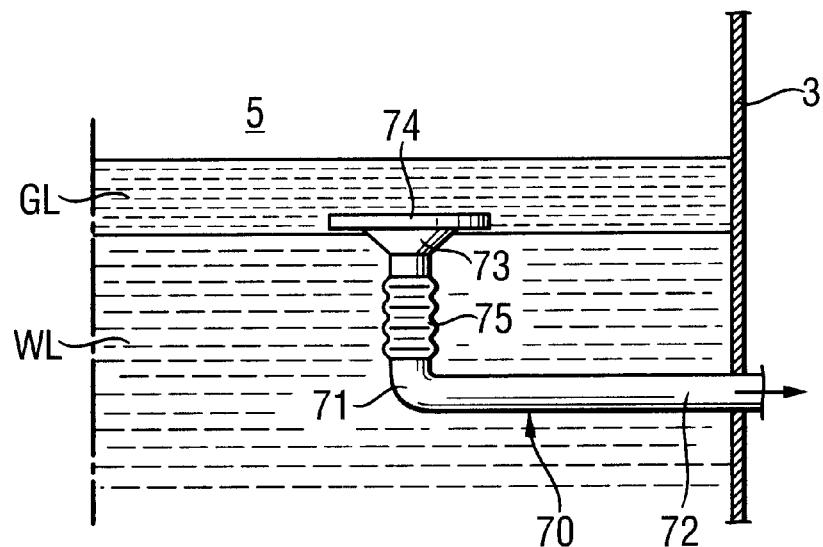
FIG. 8 shows a first embodiment of a discharge means for grease.
Figure 9:
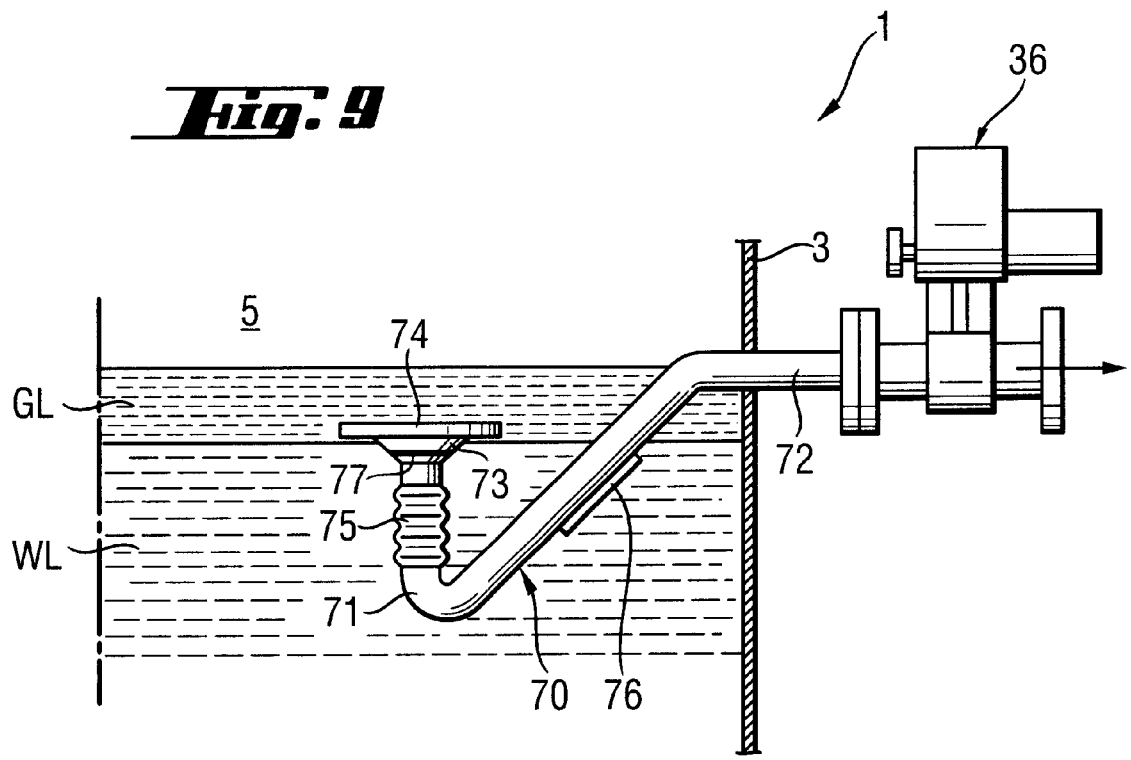
FIG. 9 shows a second embodiment of a discharge means for grease.

FIGS. 8 and 9 show a more specific embodiment of a discharge means for grease that may advantageously be employed with the separator devices described above. The discharge means basically corresponds to those described above in connection with FIGS. 5, 6 and 7, i.e. comprising a pipe means 70 with a first end 71 arranged to be positioned in the grease layer GL of a receptacle 1. The first end 71 is provided with a funnel-like receiving portion 73 having a substantially larger cross-section than the first end 71 of the pipe means 70. The second end 72 of the pipe means is arranged to lead out from the receptacle 1 through the side wall 3.

This discharge means of this embodiment has an additional advantageous arrangement. The receiving portion 73 is provided with a floating means 74. The pipe means 70 further has a flexible portion 75 at the end of its first end 71 connecting to the receiving portion 73. The floating means 74 is designed and dimensioned so that the receiving portion 73 is kept or may settle in the grease layer GL, above the separated waste water layer WL, preferably at the boundary surface of the grease layer GL and the separated waste water layer WL.

In comparison with a rigidly installed discharge means, or even a discharge means that is arranged to be adjustable or maneuverable in a horizontal and/or vertical direction, the floating means 74 ensures that the receiving portion 73 always remains just above the separated water layer WL, whereby only grease will enter the discharge means, i.e. separated waste water does not flow into the discharge means for grease. This is an advantageous arrangement, since in practice there may be variations in the flow of waste water to the receptacle.

The flexible portion 75 further improves this arrangement in providing a further degree of freedom to the movement of the receiving portion 73 already secured by the floating means 74. The flexible portion 75 allows the receiving portion 73 to follow the movements of the surface of the waste water, separated waste water layer WL and/or the grease layer GL. This would be the case for example with a separator device installed on a vehicle (in movement); for instance a ship rolling in the seas. In cases like this, as the waste water would move and splash in a separator device, waste water would from time to time enter a rigidly installed receiving portion rendering the grease separation less effective. With regard to separator devices installed in vehicle, or for other reasons subject to movement, this would thus be a preferred embodiment as the combination of the floating means 74 and the flexible portion 75 allows the receiving to follow every movement of the grease layer (waste water).

The embodiment shown in FIG. 9 corresponds to the embodiment shown in FIG. 8. This embodiment is mainly intended to show that alternative ways for the discharge of grease, in this case by providing suction from a source of vacuum as described above in connection with FIG. 5, are possible.

The receiving portion 73 and/or the pipe means 70 may also be provided with a heating means, e.g. an embedded electrical coil or the like. This is only schematically indicated by reference numerals 76 and 77 respectively in FIG. 9.

The foregoing detailed description has been given for clearness of understanding only, and no unnecessary limitations should be understood therefrom, as modifications would be obvious to those skilled in the art.

What is claimed is:

1. A method for separating grease from waste water by means of a separator device, the separator device comprising a two part receptacle with an upper first part and a lower second part separated by an inclined intermediate plate, the receptacle having an inlet port for waste water formed in the upper first part, a discharge port for separated waste water formed in the lower second part, discharge means, and an overflow pipe fluidly communicating between the receptacle first part and the receptacle second part, the method comprising:

supplying waste water through the inlet port to the receptacle upper first part;

separating the waste water by gravity in the receptacle upper first part to form an upper grease layer, an intermediate separated waste water layer, and a lower sludge layer on the inclined intermediate plate;

feeding the separated waste water from the separated waste water layer through the overflow pipe from the receptacle upper first part to the receptacle lower second part;

removing at least one of a group of materials consisting of grease from the grease layer and sludge from the sludge layer from the receptacle upper first part through the discharge means; and collecting separated waste water in the receptacle lower second part for discharge from the discharge port.

2. The method of claim 1, in which the sludge layer on the intermediate plate is raised to a first level by supplying waste water to the receptacle upper first part, and the separated waste water layer is lowered to a second level, substantially adjacent the first level, by discharging separated waste water from the receptacle upper first part to the receptacle lower second part.

3. The method of claim 1, in which the grease layer, the separated waste water layer, and the sludge layer are controlled by control means.

4. The method of claim 1, in which the separated waste water level in the receptacle lower second part is controlled by level control means.

5. The method of claim 1, in which the discharge means comprises a discharge port for removing grease from the grease layer.

6. The method of claim 5, in which the grease is removed from the discharge port by way of gravity.

7. The method of claim 5, in which the grease is removed from the discharge port by a pump means.

8. The method of claim 1, in which grease is removed from the grease layer by a suction means extending into the grease layer.

9. The method of claim 1, in which grease is removed from the grease layer by a pipe means comprising a receiving portion with a substantially larger cross-section than the pipe means, the receiving portion opening upwards towards a surface area of the grease layer.

10. The method of claim 9, in which the receiving portion settles in the grease layer, above the separated waste water layer, and in which the receiving portion follows movement of the grease layer and the separated waste water layer.

11. The method of claim 1, in which at least the receptacle upper first part is heated by heating means.

12. The method of claim 1, in which at least the receptacle upper first part is cleaned by cleaning means.

13. A separator device for separating grease from waste water, the separator device comprising:

a two part receptacle with an upper first part and a lower second part separated by a plate;

an inlet port for waste water formed in the receptacle upper first part, the waste water in the receptacle upper first part separating, under gravity, into an upper grease layer, an intermediate separated waste water layer, and a lower sludge layer, on the plate;

a discharge port for separated waste water formed in the lower second part of the receptacle;

means for discharging at least one of a group of materials consisting of grease from the grease layer and sludge from the sludge layer communicating with the receptacle upper first part; and an overflow pipe establishing fluid communication between the receptacle upper first part and the receptacle lower second part, the overflow pipe having an inlet opening disposed in the receptacle upper first part adjacent the plate, and an outlet opening disposed in the receptacle lower second part, wherein the overflow pipe feeds separated waste water from the separated waste water layer between the grease layer and the sludge layer into the receptacle lower second part.

14. The separator device of claim 13, in which the overflow pipe has a generally U-shaped configuration, and in which the overflow pipe outlet opening is positioned inside the receptacle lower second part adjacent the plate.

15. The separator device of claim 13, in which the receptacle comprises a connecting pipe having a first end in fluid communication with the receptacle upper first part and a second end in fluid communication with the receptacle lower second part, and a valve means positioned between the first and second ends.

16. The separator device of claim 13, in which the plate has a substantially inclined configuration.

17. The separator device of claim 13, in which the receptacle upper first part comprises a control means.

18. The separator device of claim 13, in which the receptacle lower second part comprises an upper level control means and a lower level control means.

19. The separator device of claim 18, in which a pump means is connected to the discharge port.

20. The separator device of claim 18, in which a valve means is connected to the discharge port.

21. The separator device of claim 13, in which the discharge means comprises a discharge port adjacent a lowermost end of the plate.

22. The separator device of claim 21, in which the discharge port of the discharge means is provided with a valve means.

23. The separator device of claim 21, in which the discharge port of the discharge means is provided with a pump means.

24. The separator device of claim 13, in which the discharge means comprises a suction means.

25. The separator device of claim 13, in which the discharge means comprises a manhole.

26. The separator device of claim 13, in which the discharge means comprises a pipe means with a first end positioned in the receptacle upper first part and a second end leading out of the receptacle, the first end of the pipe means having a receiving portion with a substantially larger cross-section than the first end of the pipe means, wherein the receiving portion is positioned in the grease layer so that the discharge means discharges grease.

27. The separator device of claim 26, in which the receiving portion of the pipe means opens upwards.

28. The separator device of claim 27, in which the receiving portion is adjustable in at least one of a horizontal direction and a vertical direction.

29. The separator device of claim 28, in which the receiving portion includes a floating means.

30. The separator device of claim 28, in which at least part of the pipe means is flexible.

31. The separator device according to claim 30, in which the first end of the pipe means includes a flexible portion.

32. The separator device of claim 27, in which the receiving portion has a funnel-like configuration.

33. The separator device of claim 26, in which the receiving portion includes a heating means.

34. The separator device of claim 26, in which the pipe means includes a heating means.

35. The separator device of claim 13, in which a heating means is provided in at least the receptacle upper first part.

36. The separator device of claim 13, in which a cleaning means is provided in at least the receptacle upper first part.

37. The separator device of claim 13, in which the receptacle upper first part includes a ventilation means, and in which the receptacle lower second part includes a ventilation means, a high level control means, and a supplementary discharge port at a lower area of the receptacle lower second part.

* * * * *